United States Patent
Kurita et al.

(10) Patent No.: US 11,538,260 B2
(45) Date of Patent: Dec. 27, 2022

(54) OBJECT IDENTIFICATION APPARATUS, OBJECT IDENTIFICATION METHOD, AND NONTRANSITORY COMPUTER READABLE MEDIUM STORING CONTROL PROGRAM

(71) Applicant: NEC Solution Innovators, Ltd., Tokyo (JP)

(72) Inventors: Yuji Kurita, Tokyo (JP); Yasushi Taya, Tokyo (JP); Junichi Kiyamura, Tokyo (JP); Yasutoshi Fukaya, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 146 days.

(21) Appl. No.: 17/043,385

(22) PCT Filed: Sep. 14, 2018

(86) PCT No.: PCT/JP2018/034115
§ 371 (c)(1),
(2) Date: Sep. 29, 2020

(87) PCT Pub. No.: WO2019/187216
PCT Pub. Date: Oct. 3, 2019

(65) Prior Publication Data
US 2021/0019501 A1 Jan. 21, 2021

(30) Foreign Application Priority Data
Mar. 30, 2018 (JP) .............................. JP2018-069753

(51) Int. Cl.
*G06K 9/62* (2022.01)
*G06V 10/25* (2022.01)
(Continued)

(52) U.S. Cl.
CPC ............. *G06V 20/64* (2022.01); *G06K 9/622* (2013.01); *G06K 9/6267* (2013.01); *G06V 10/25* (2022.01); *G06V 10/60* (2022.01); *G01S 7/4802* (2013.01)

(58) Field of Classification Search
None
See application file for complete search history.

(56) References Cited

U.S. PATENT DOCUMENTS
2010/0002942 A1    1/2010   Watson

FOREIGN PATENT DOCUMENTS
JP     3654042 B2 *  6/2005
JP     3654042 B2    6/2005
(Continued)

OTHER PUBLICATIONS

Zhenzhen Wu, Huiyun Liu, Kuangyu Li, Jie Mao, Xitong Zhang, "Extraction of rod-like objects from vehicle-borne LiDAR data," Proc. SPIE 9901, 2nd ISPRS International Conference on Computer Vision in Remote Sensing (CVRS 2015), 990106 (Mar. 2, 2016, https://doi.org/10.1117/12.2234851 (Year: 2016).*

(Continued)

*Primary Examiner* — Bernard Krasnic
(74) *Attorney, Agent, or Firm* — Sughrue Mion, PLLC (57) ABSTRACT

A data conversion processing unit converts a second group including a plurality of reflection point data units in which a reflection point corresponding to each reflection point data unit belongs to a three-dimensional object among a first data unit group into a third group including a plurality of projection point data units by projecting the second group onto a horizontal plane in a world coordinate system. A clustering processing unit clusters the plurality of projection point data units of the third group into a plurality of clusters based on positions of these units on the horizontal plane. A space of (Continued)

interest setting unit sets a space of interest for each cluster by using the plurality of reflection point data units corresponding to the plurality of projection point data units included in each cluster.

15 Claims, 8 Drawing Sheets

(51) Int. Cl.
  *G06V 20/64* (2022.01)
  *G06V 10/60* (2022.01)
  *G01S 7/48* (2006.01)

(56) References Cited

FOREIGN PATENT DOCUMENTS

| | | | | |
|---|---|---|---|---|
| JP | 2007104171 | A * | 4/2007 | ........... G01S 17/023 |
| JP | 2007-288460 | A | 11/2007 | |
| JP | 2011-185664 | A | 9/2011 | |
| JP | 2014-219847 | A | 11/2014 | |
| JP | 2015-114261 | A | 6/2015 | |
| JP | 2015114261 | A * | 6/2015 | |
| JP | 2017-027197 | A | 2/2017 | |
| JP | 2017-166846 | A | 9/2017 | |

OTHER PUBLICATIONS

H. Fan, J. Xiang and F. Ni, "Multilayer feature combination for visual tracking," 2015 3rd IAPR Asian Conference on Pattern Recognition (ACPR), 2015, pp. 589-593, doi: 10.1109/ACPR.2015.7486571 (Year: 2015).*

International Search Report for PCT/JP2018/034115 dated Nov. 27, 2018 [PCT/ISA/210].

Written Opinion for PCT/JP2018/034115 dated Nov. 27, 2018 [PCT/ISA/237].

Extended European Search Report for EP Application No. 18911544.7 dated on Apr. 23, 2021.

Wu Zhenzhen et al: "Extraction of rod-like objects from vehicle-borne LiDAR data", Proceedings of SPIE, vol. 9901, Mar. 2, 2016, pp. 990106_1-990106_6.

Zhang Mingfang et al: "Pedestrian Detection Using Multi-layer LIDAR", International Conference on Transportation Infrastructure and Materials, ICTIM 2016, pp. 575-582.

Wang Heng et al: "Pedestrian recognition and tracking using 3D LiDAR for autonomous vehicle", Robotics and Autonomous Systems, vol. 88, Feb. 1, 2017, pp. 71-78.

Scott Shaobing Chen et al: "Clustering via the Bayesian information criterion with applications in speech recognition", Proceedings of the 1998 IEEE International Conference on Acoustics, Speech and Signal Processing. vol. 2, May 12, 1998, pp. 645-648.

Fan Heng et al: "Multilayer feature combination for visual tracking", 2015 3rd IAPR Asian Conference on Pattern Recognition (ACPR), IEEE, Nov. 3, 2015, pp. 589-593.

Qinpei Zhao et al: "Knee Point Detection on Bayesian Information Criterion", 2008 20th IEEE International Conference on Tools With Artificial Intelligence, Nov. 3, 2008, pp. 431-438.

* cited by examiner

OBJECT IDENTIFICATION APPARATUS, OBJECT IDENTIFICATION METHOD, AND NONTRANSITORY COMPUTER READABLE MEDIUM STORING CONTROL PROGRAM

CROSS REFERENCE TO RELATED APPLICATIONS

This application is a National Stage of International Application No. PCT/JP2018/034115 filed Sep. 14, 2018, claiming priority based on Japanese Patent Application No. 2018-069753 filed Mar. 30, 2018, the entire disclosure of which is incorporated herein.

TECHNICAL FIELD

The present disclosure relates to an object identification apparatus, an object identification method, and a control program.

BACKGROUND ART

An object recognition apparatus that recognizes an object using a range-finding point group acquired by a laser radar has been proposed (e.g., Patent Literature 1).

Further, an object identification apparatus that identifies an object in a captured image based on a feature value has been proposed (e.g., Patent Literature 2). However, if occlusion has occurred in the object captured in the captured image, the accuracy of an object identification may be reduced.

CITATION LIST

Patent Literature

Patent Literature 1: Japanese Unexamined Patent Application Publication No. 2017-166846
Patent Literature 2: Japanese Unexamined Patent Application Publication No. 2014-219847

SUMMARY OF INVENTION

Technical Problem

The inventors of the present disclosure have found that by setting a Region Of Interest (ROI) using reflection point data acquired by using a laser radar, the accuracy of an object identification for identifying an object in a captured image based on a feature value can be improved even when occlusion has occurred in a three-dimensional object existing within an irradiation direction range of the laser radar.

An object of the present disclosure is to provide an object identification apparatus, an object identification method, and a control program that are capable of improving the accuracy of an object identification.

Solution to Problem

An object identification apparatus according to a first aspect includes: a reflection point group information acquisition unit configured to acquire a plurality of reflection point data units as a first data unit group, the plurality of reflection point data units being obtained by irradiating an irradiation light from an irradiation point toward irradiation directions that are successively changed in an irradiation direction range and receiving a reflected light that is light irradiated toward each irradiation direction and reflected at a reflection point of an object, the plurality of reflection point data units respectively corresponding to the reflection points that respectively correspond to the irradiation directions, the plurality of reflection point data units including reflection point position coordinates that include the irradiation directions and distances between each reflection point and the irradiation point; a data conversion processing unit configured to convert a second data unit group including a plurality of reflection point data units in which the reflection point corresponding to each reflection point data unit belongs to a three-dimensional object among the first data unit group into a third data unit group including a plurality of projection point data units by projecting the second data unit group onto a horizontal plane in a world coordinate system; a clustering processing unit configured to cluster the plurality of projection point data units into a plurality of clusters based on positions of these units on the horizontal plane; and a space of interest setting unit configured to set a space of interest in the world coordinate system for each cluster by using the plurality of reflection point data units corresponding to the plurality of projection point data units included in each of the clustered clusters.

An object identification method according to a second aspect includes: acquiring a plurality of reflection point data units as a first data unit group, the plurality of reflection point data units being obtained by irradiating an irradiation light from an irradiation point toward irradiation directions that are successively changed in an irradiation direction range and receiving a reflected light that is light irradiated toward each irradiation direction and reflected at a reflection point of an object, the plurality of reflection point data units respectively corresponding to the reflection points that respectively correspond to the irradiation directions, the plurality of reflection point data units including reflection point position coordinates that include the irradiation directions and distances between each reflection point and the irradiation point; converting a second data unit group including a plurality of reflection point data units in which the reflection point corresponding to each reflection point data unit belongs to a three-dimensional object among the first data unit group into a third data unit group including a plurality of projection point data units by projecting the second data unit group onto a horizontal plane in a world coordinate system; clustering the plurality of projection point data units into a plurality of clusters based on positions of these units on the horizontal plane; and setting a space of interest in the world coordinate system for each cluster by using the plurality of reflection point data units corresponding to the plurality of projection point data units included in each of the clustered clusters.

A control program according to a third aspect causes an object identification apparatus to execute the following processing of: acquiring a plurality of reflection point data units as a first data unit group, the plurality of reflection point data units being obtained by irradiating an irradiation light from an irradiation point toward irradiation directions that are successively changed in an irradiation direction range and receiving a reflected light that is light irradiated toward each irradiation direction and reflected at a reflection point of an object, the plurality of reflection point data units respectively corresponding to the reflection points that respectively correspond to the irradiation directions, the plurality of reflection point data units including reflection point position coordinates that include the irradiation directions and distances between each reflection point and the irradiation point; converting a second data unit group including a plurality of reflection point data units in which the reflection point corresponding to each reflection point data unit belongs to a three-dimensional object among the first data unit group into a third data unit group including a plurality of projection point data units by projecting the second data unit group onto a horizontal plane in a world coordinate system; clustering the plurality of projection point data units into a plurality of clusters based on positions of these units on the horizontal plane; and setting a space of interest in the world coordinate system for each cluster by using the plurality of reflection point data units corresponding to the plurality of projection point data units included in each of the clustered clusters.

Advantageous Effects of Invention

According to the present disclosure, it is possible to provide an object identification apparatus, an object identification method, and a control program that are capable of improving the accuracy of an object identification.

DESCRIPTION OF EMBODIMENTS

Example embodiments will be described hereinafter with reference to the drawings. Note that the same or equivalent components will be denoted by the same reference symbols throughout the example embodiments, and repeated descriptions will be omitted.

First Example Embodiment

Figure 1:
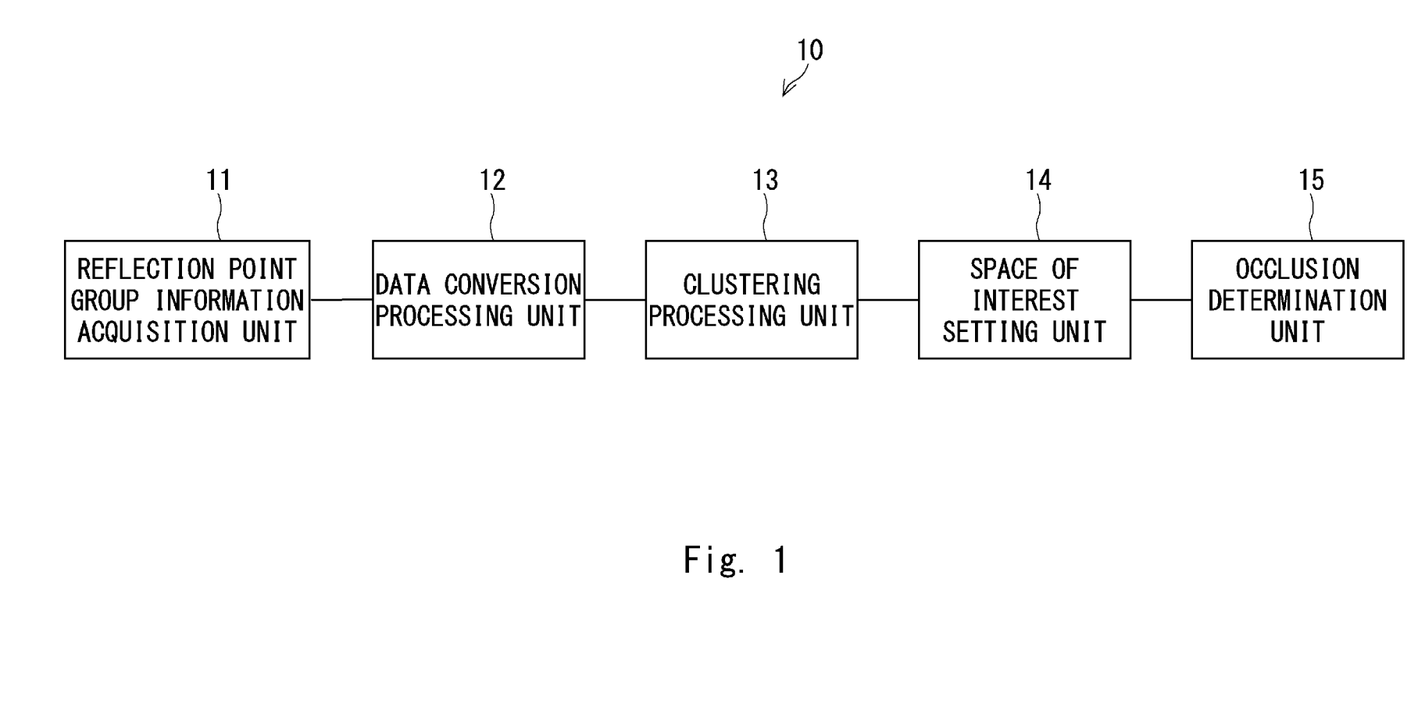
FIG. 1 is a block diagram showing an example of an object identification apparatus according to a first example embodiment.

FIG. 1 is a block diagram showing an example of an object identification apparatus according to a first example embodiment. In FIG. 1, an object identification apparatus 10 includes a reflection point group information acquisition unit 11, a data conversion processing unit 12, a clustering processing unit 13, a space of interest setting unit 14, and an occlusion determination unit 15. In the following description, the reflection point group information acquisition unit 11 may be referred to as an acquisition unit 11, and the occlusion determination unit 15 may be referred to as a determination unit 15.

The acquisition unit 11 acquires a "plurality of reflection point data units" as a "first data unit group". The "plurality of reflection point data units" of the "first data unit group" are obtained by a laser radar (not shown) (e.g., LiDAR: Light Detection and Ranging). That is, the "first data unit group" is obtained by causing the laser radar to irradiate irradiation light from an irradiation point toward irradiation directions that are successively changed in an "irradiation direction range" and receiving a reflected light that is light irradiated toward each irradiation direction and reflected at a reflection point of an object. For example, a plurality of irradiation directions in which irradiation light is irradiated by the laser radar in the irradiation direction range are different from each other in at least one of the horizontal direction and the vertical direction. Further, the reflection point data units of the "first data unit group" respectively correspond to the reflection points that respectively correspond to the irradiation directions, and include "reflection point position coordinates" including the irradiation directions and distances between each reflection point and the irradiation point.

The data conversion processing unit 12 projects, onto a "horizontal plane in a world coordinate system", a "second data unit group" including a plurality of reflection point data units in which the reflection point corresponding to each reflection point data unit belongs to a three-dimensional object among the "first data unit group". By doing so, the data conversion processing unit 12 converts the "second data unit group" into a "third data unit group" including a "plurality of projection point data units". In the following description, the "horizontal plane in the world coordinate system" is simply referred to as a "horizontal plane". It should be noted that the reflection point data units in which the reflection points belong to a road surface can be easily removed by a conventional method. The "second data unit group" is obtained by removing the reflection point data units in which the reflection points belong to the road surface from the "first data unit group".

The clustering processing unit 13 clusters the "plurality of projection point data units" of the "third data unit group" into a plurality of clusters based on the positions of these units on the "horizontal plane". For this clustering processing, for example, x-means clustering is used.

The space of interest setting unit 14 sets a "space of interest" in the world coordinate system for each cluster using the plurality of reflection point data units corresponding to the plurality of projection point data units included in each of the clusters clustered by the clustering processing unit 13. The "space of interest" is a three-dimensional (3D) Region Of Interest (ROI).

The determination unit 15 determines whether occlusion has occurred in the three-dimensional object corresponding to each cluster based on the positional relationship among the plurality of spaces of interest in the horizontal plane, the plurality of spaces of interest being set for each of the plurality of clusters by the space of interest setting unit 14.

As described above, in the object identification apparatus 10, by setting a space of interest (a three-dimensional ROI) using the reflection point data acquired using the laser radar, it is possible to accurately set the space of interest corresponding to a three-dimensional object even when occlusion has occurred in the three-dimensional object existing within the irradiation direction range of the laser radar. As a result, in the object identification apparatus 10, it is possible to improve the accuracy of an object identification for identifying an object in the captured image based on a feature value. Note that in the above description, it is assumed that the object identification apparatus 10 includes the determination unit 15, but the same effect as that described above can be obtained even when the object identification apparatus 10 does not include the determination unit 15.

Second Example Embodiment

A second example embodiment relates to improvement of clustering processing. The basic configuration of an object identification apparatus according to the second example embodiment is the same as that of the object identification apparatus 10 according to the first example embodiment and is thus described with reference to FIG. 1.

In a typical x-means clustering, division processing (k-means (k=2)) is repeated for each cluster until a division termination condition in which a Bayesian Information Criterion (BIC) after the division is smaller than the BIC before the division is satisfied. This typical x-means clustering adopts a circular cluster as a model. On the other hand, when a pedestrian is regarded as an "object to be identified", the pedestrian does not always have a circular shape in a bird's-eye view image. Consequently, when the typical x-means clustering is used, two different pedestrians or a pedestrian and a non-pedestrian, who should normally be clustered in clusters different from each other, may be clustered in one cluster.

Therefore, in the second example embodiment, the termination condition of the division processing is modified so that an "excessive division" into smaller clusters is performed. By doing so, even if one pedestrian is clustered into a plurality of clusters, it is possible to prevent two different pedestrians or a pedestrian and a non-pedestrian from being clustered into one cluster. Then, in a plurality of spaces of interest set in a plurality of clusters, by integrating two spaces of interest satisfying an integration condition, it is possible to integrate a plurality of spaces of interest set in a plurality of clusters related to one pedestrian.

Here, the Bayesian information criterion (BIC) can be expressed, for example, by the following Expression (1).

$$BIC = -2\log(L) + k\log(n) \quad (1)$$

In the Expression, L represents a likelihood function, and n represents the number of data.

In the object identification apparatus 10 according to the second example embodiment, the clustering processing unit 13 executes the clustering processing using the following "modified termination condition of the division processing". This "modified termination condition" is a condition that the number of projection point data units included in each cluster is a predetermined number or less and that the Bayes information criterion after the division is smaller than a "modified criterion" obtained by multiplying the Bayes information criterion before the division by a "predetermined coefficient". The "predetermined coefficient" is a value greater than zero and less than one. That is, the clustering processing unit 13 repeats the division and forms a plurality of clusters until the "modified termination condition" is satisfied.

In the object identification apparatus 10 according to the second example embodiment, the space of interest setting unit 14 sets a plurality of spaces of interest for the plurality of clusters formed by the clustering processing unit 13 as in the case of the first example embodiment. The space of interest setting unit 14 according to the second example embodiment further sets a space of interest obtained by integrating two spaces of interest that overlap each other in the "horizontal plane" among a plurality of spaces of interest set in the plurality of clusters formed by the clustering processing unit 13. At this time, the length of the overlap may be used as a condition for integration.

Note that before proceeding to the integration processing of the spaces of interest, the space of interest setting unit 14 may create histograms of the directions along each of the two axes of the "horizontal plane" of each space of interest that has been set at that time, and reset the spaces of interest using the coordinates wherein the number of points between the coordinate and a peak corresponds to a match threshold (B % of the number of points in the cluster). Then, the space of interest setting unit 14 may further set a space of interest obtained by integrating two spaces of interest that overlap each other in the "horizontal plane" among the reset spaces of interest.

Third Example Embodiment

A third example embodiment relates to a more specific example embodiment.

<Configuration Example of Object Identification Apparatus>

Figure 2:
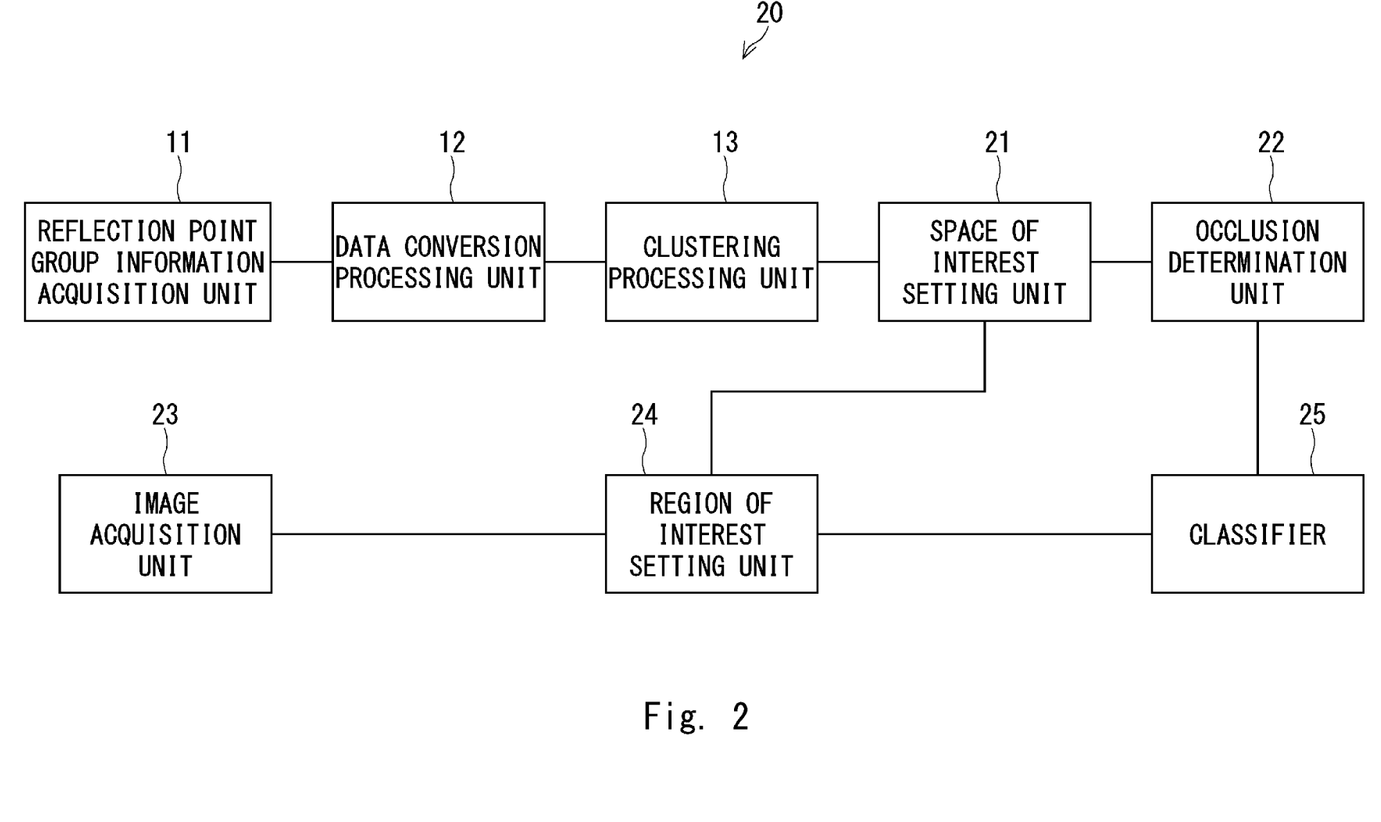
FIG. 2 is a block diagram showing an example of an object identification apparatus according to a third example embodiment.

FIG. 2 is a block diagram showing an example of an object identification apparatus according to a third example embodiment. In FIG. 2, an object identification apparatus 20 includes a space of interest setting unit 21, a determination unit (an occlusion determination unit) 22, an image acquisition unit 23, a region of interest setting unit 24, and a classifier 25, in addition to the acquisition unit (the reflection point group information acquisition unit) 11, the data conversion processing unit 12, and the clustering processing unit 13.

Figure 3:
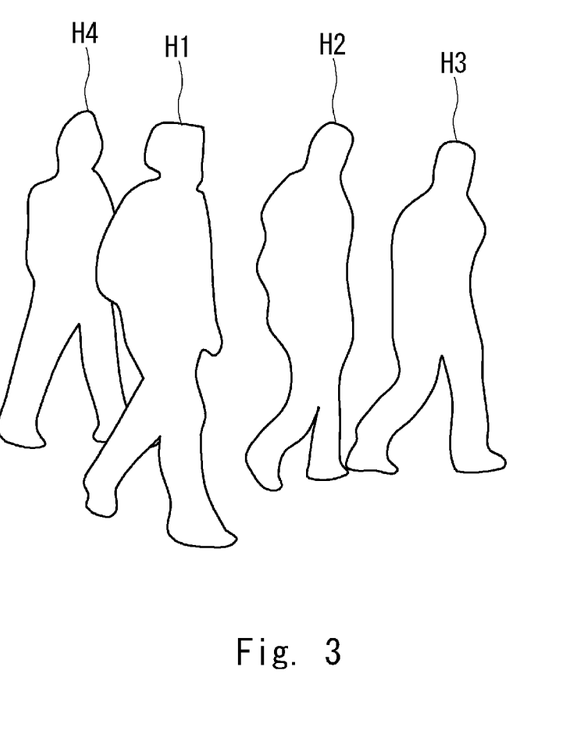
FIG. 3 shows an example of a captured image.

The image acquisition unit 23 acquires data of a captured image captured by an imaging unit (not shown). FIG. 3 shows an example of the captured image. In FIG. 3, the captured image includes images of four human beings H1, H2, H3, and H4. Further, a part of the human being H4 is hidden behind the human being H1. That is, occlusion has occurred in the human being H4.

Further, the acquisition unit 11 acquires a "plurality of reflection point data units" in the situation as shown in the captured image of FIG. 3 as a "first data unit group". It should be noted that each reflection point data unit according to the third example embodiment further includes a received light intensity of a reflected light corresponding to each of the reflection points.

Then, the data conversion processing unit 12 projects, onto the "horizontal plane in the world coordinate system", a "second data unit group" including a plurality of reflection point data units in which the reflection point corresponding to each reflection point data unit belongs to a three-dimensional object among the "first data unit group". By doing so, the data conversion processing unit 12 converts the "second data unit group" into a "third data unit group" including a "plurality of projection point data units".

Figure 4:
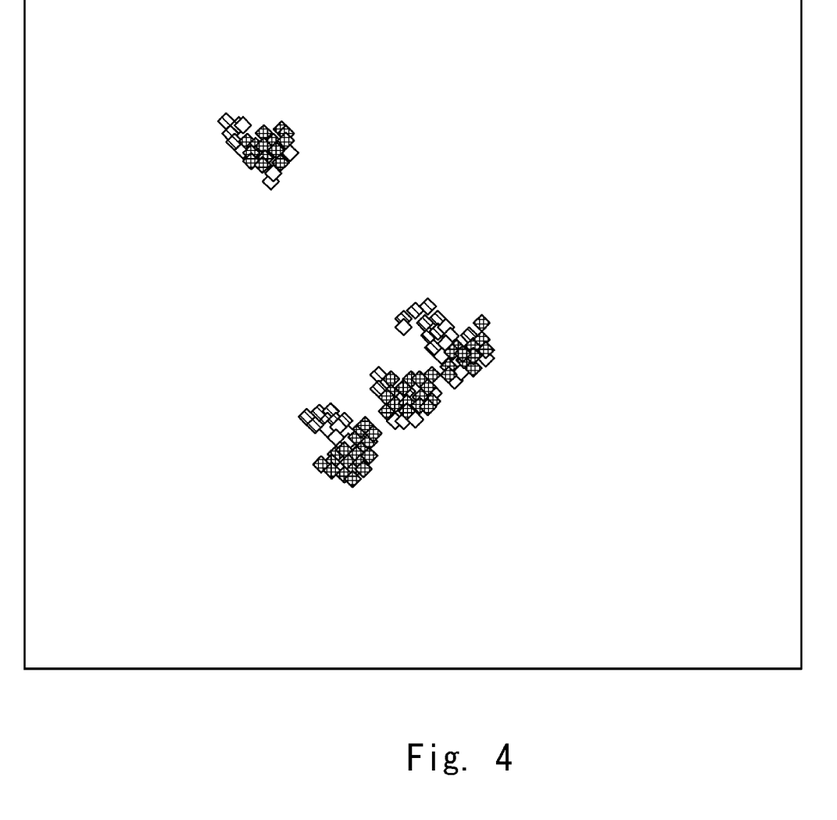
FIG. 4 is a diagram for explaining a projected image.

FIG. 4 shows a "projected image" in the horizontal plane using the "third data unit group" obtained in the situation as shown in the captured image of FIG. 3. In the projected image, there are blocks (a point group) corresponding to each of the human beings H1, H2, H3, and H4. FIG. 4 is a diagram for explaining the projected image.

Figure 5:
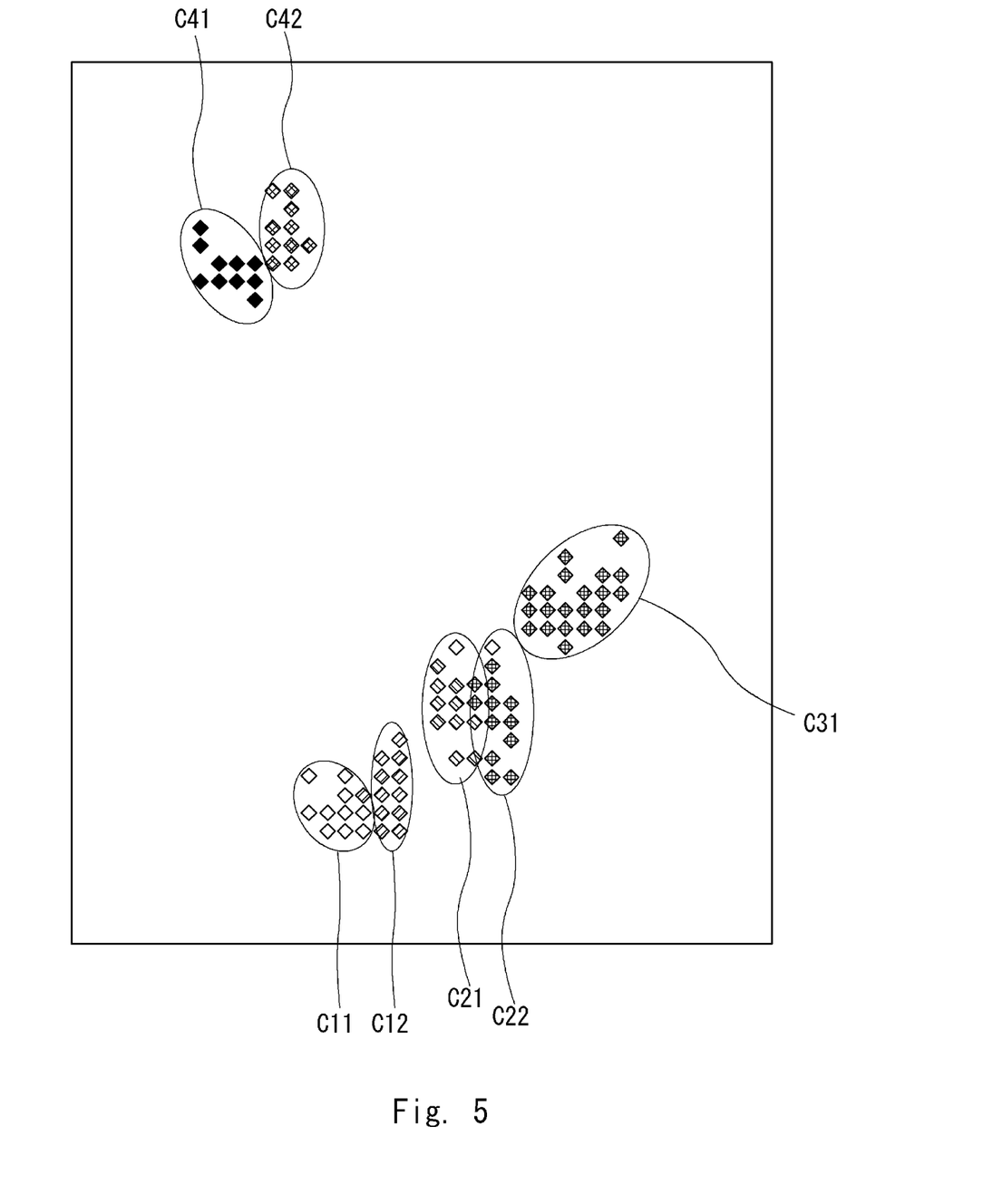
FIG. 5 is a diagram showing an excessively divided cluster.

The clustering processing unit 13 repeats the division and forms a plurality of clusters until the "modified termination condition" is satisfied as in the case of the second example embodiment. FIG. 5 is a diagram showing an excessively divided cluster. As shown in FIG. 5, the projection points corresponding to the human being H1 are divided into two clusters C11 and C12. Further, the projection points corresponding to the human being H2 are divided into two clusters C21 and C22, and the projection points corresponding to the human being H4 are divided into two clusters C41 and C42.

Like the space of interest setting unit 14 according to the second example embodiment, the space of interest setting unit 21 sets a space of interest for each of the plurality of clusters formed by the clustering processing unit 13. Then, the space of interest setting unit 21 further sets a space of interest obtained by integrating two spaces of interest that overlap each other in the "horizontal plane" among a plurality of spaces of interest respectively set in the plurality of clusters formed by the clustering processing unit 13.

Figure 6:
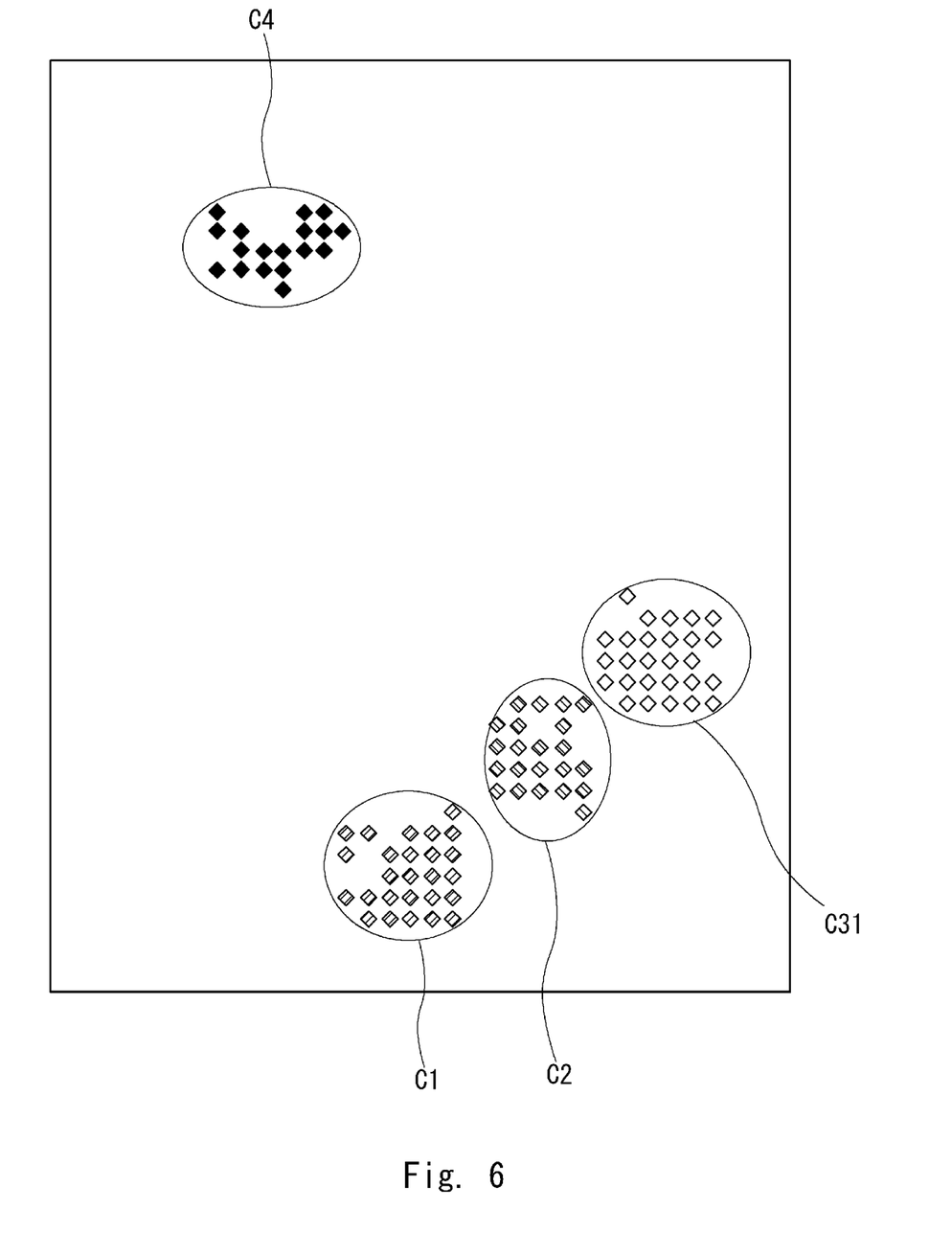
FIG. 6 shows a diagram for explaining integration of spaces of interest.

It should be noted that the space of interest set in the cluster C11 and the space of interest set in the cluster C12 that are shown in FIG. 5 overlap each other in the horizontal plane. Therefore, in addition to the space of interest set in the cluster C11 and the space of interest set in the cluster C12, the space of interest setting unit 21 further sets a space of interest obtained by integrating the space of interest set in the cluster C11 with the space of interest set in the cluster C12. By doing so, as shown in FIG. 6, a cluster C1 obtained by integrating the cluster C11 with the cluster C12 is also set as one cluster. Similarly, the space of interest setting unit 21 further sets a space of interest obtained by integrating the space of interest set in the cluster C21 with the space of interest set in the cluster C22. By doing so, as shown in FIG. 6, a cluster C2 obtained by integrating the cluster C21 with the cluster C22 is also set as one cluster. Similarly, the space of interest setting unit 21 further sets a space of interest obtained by integrating the space of interest set in the cluster C41 with the space of interest set in the cluster C42. By doing so, as shown in FIG. 6, a cluster C4 obtained by integrating the cluster C41 with the cluster C42 is also set as one cluster. FIG. 6 shows a diagram for explaining integration of the spaces of interest.

Then, the space of interest setting unit 21 specifies a "cluster to be excluded" corresponding to an object whose type is different from the type of the object to be identified among the plurality of clusters based on the received light intensity of the reflection point data unit included in each target space of interest among the plurality of set spaces of interest. It should be noted that as the object to be identified is a human being, the characteristic of the received light intensity of the reflected light reflected by a three-dimensional object other than the human being is different from that of the reflected light reflected by the human being. By using the above difference in the characteristic of the received light intensity, it is possible to specify a "cluster to be excluded" that is different from the type of the object to be identified.

Further, the space of interest setting unit 21 specifies a "cluster to be excluded" corresponding to a space of interest whose width, height, and depth do not satisfy a "shape criterion of the object to be identified" among the plurality of set spaces of interest. It should be noted that when the object to be identified is a human being, the shape of the space of interest set in the cluster corresponding to the human being satisfies a predetermined shape criterion. Accordingly, by using the shape criterion of a human being, it is possible to specify a "cluster to be excluded" that is different from the type of the object to be identified.

Further, the space of interest setting unit 21 specifies a "cluster to be excluded" corresponding to a space of interest whose size of a region of interest obtained by projecting the space of interest onto the vertical plane in the world coordinate system does not satisfy a size criterion of the object to be identified among the plurality of set spaces of interest. It should be noted that when the object to be identified is a human being, the size of the space of interest set in the cluster corresponding to the human being satisfies a predetermined size criterion. Accordingly, by using the size criterion of a human being, it is possible to specify a "cluster to be excluded" that is different from the type of the object to be identified. In the following descriptions, a vertical plane in the world coordinate system may be simply referred to as a vertical plane. Note that the vertical plane is, for example, a plane not parallel to the extension line of the optical axis of the imaging unit (not shown), and is, for example, a plane orthogonal to the extension line of the optical axis of the imaging unit (not shown).

Then, the space of interest setting unit 21 removes a space of interest that is set to the specified cluster to be excluded.

Like the determination unit 15 according to the first and the second example embodiments, the determination unit 22 determines whether occlusion has occurred in the three-dimensional object corresponding to each cluster based on the positional relationship among the plurality of spaces of interest in the horizontal plane, the plurality of spaces of interest being set for the plurality of clusters by the space of interest setting unit 21. This plurality of spaces of interest set for each of the plurality of clusters by the space of interest setting unit 21 are the remaining plurality of spaces of interest that have not been removed by the space of interest setting unit 21.

For example, the determination unit 22 specifies, when a first space of interest and a second space of interest that constitute a pair are projected onto the vertical plane, a pair of the spaces of interest in which the first and the second spaces of interest overlap each other among all pairs of the spaces of interest in the plurality of spaces of interest set by the space of interest setting unit 21. Then, the determination unit 22 determines that occlusion has occurred in a three-dimensional object corresponding to the cluster that corresponds to either the first space of interest or the second space of interest of the specified pair of spaces of interest, whichever is farther from the irradiation point. For example, the space of interest set in the cluster C1 and the space of interest set in the cluster C4 that are shown in FIG. 6 overlap each other when they are projected onto the vertical plane. The cluster C4 is located farther from the irradiation point than the cluster C1. Therefore, the determination unit 22 determines that occlusion has occurred in the three-dimensional object corresponding to the cluster C4.

The region of interest setting unit 24 sets a "region of interest" corresponding to the space of interest (i.e., the remaining space of interest that has not been removed) set by the space of interest setting unit 21 for the captured image acquired by the image acquisition unit 23. The "region of interest" is a two-dimensional (2D) Region Of Interest (ROI).

The classifier 25 identifies the three-dimensional object corresponding to the region of interest by using the feature value of the region of interest set by the region of interest setting unit 24. In particular, when the determination unit 22 determines that occlusion has occurred in the three-dimensional object corresponding to the region of interest, the classifier 25 identifies the three-dimensional object corresponding to the region of interest by using the feature value of the region obtained by excluding the occlusion region from the region of interest. Here, for example, a Histogram of Oriented Gradients (HOG) is used as the feature value. Further, the classifier 25 is, for example, a cascade type AdaBoost classifier.

<Operation Example of Object Identification Apparatus>

Figure 7:
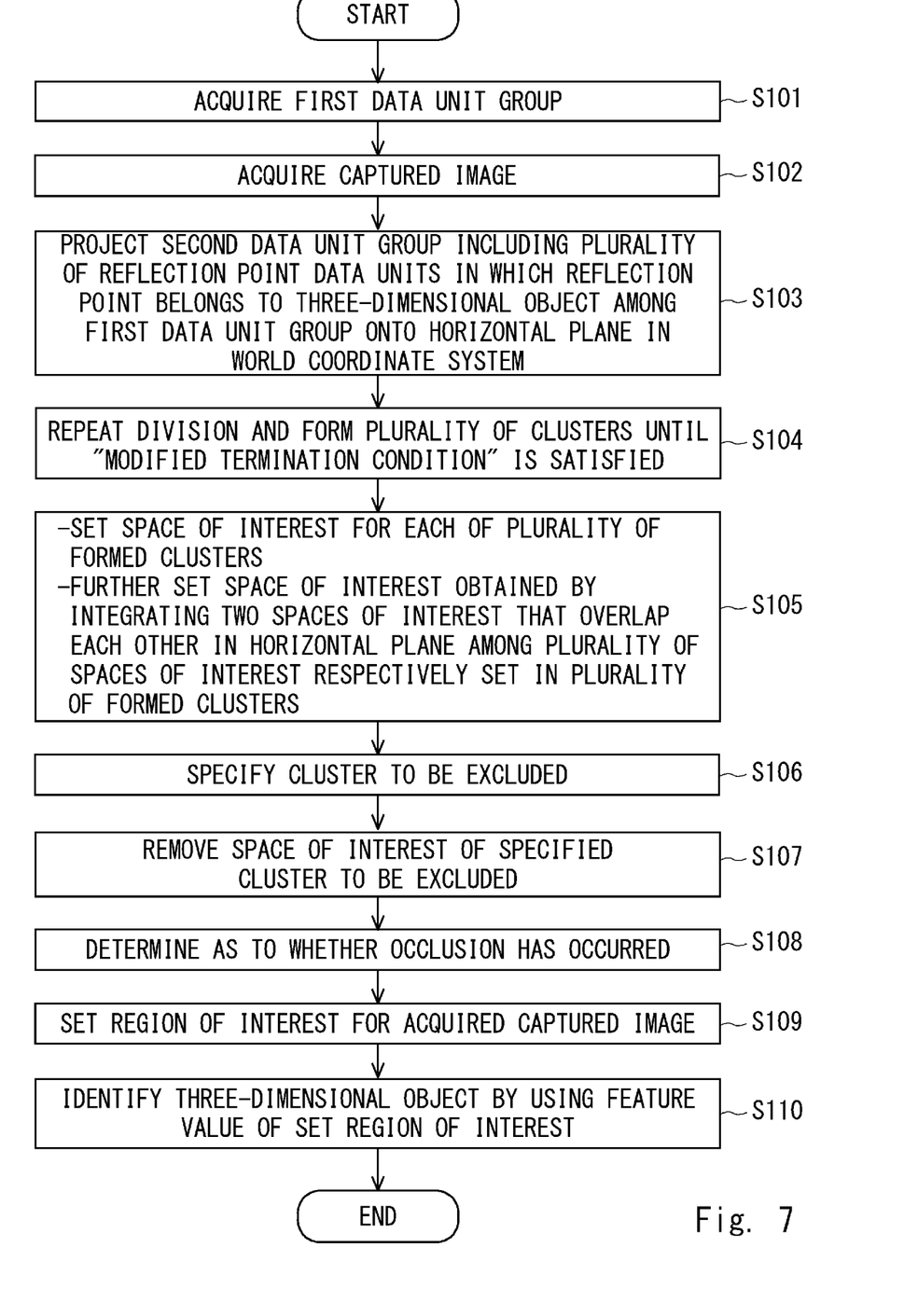
FIG. 7 is a flowchart showing an example of a processing operation of the object identification apparatus according to the third example embodiment.

An example of a processing operation of the object identification apparatus according to the third example embodiment having the above-described configuration is described. FIG. 7 is a flowchart showing an example of the processing operation of the object identification apparatus according to the third example embodiment.

The acquisition unit 11 acquires a "plurality of reflection point data units" as a "first data unit group" (Step S101). The image acquisition unit 23 acquires a captured image captured by the imaging unit (not shown) (Step S102).

The data conversion processing unit 12 projects, onto the horizontal plane in the world coordinate system, a second data unit group including a plurality of reflection point data units in which the reflection point corresponding to each reflection point data unit belongs to a three-dimensional object among the first data unit group (Step S103). By doing so, the data conversion processing unit 12 converts the "second data unit group" into a "third data unit group" including a "plurality of projection point data units".

The clustering processing unit 13 repeats the division and forms a plurality of clusters until the "modified termination condition" is satisfied (Step S104).

The space of interest setting unit 21 sets a space of interest for each of the plurality of clusters formed by the clustering processing unit 13 (Step S105). Then, the space of interest setting unit 21 further sets a space of interest obtained by integrating two spaces of interest that overlap each other in the "horizontal plane" among a plurality of spaces of interest respectively set in the plurality of clusters formed by the clustering processing unit 13 (Step S105).

The space of interest setting unit 21 specifies a "cluster to be excluded" that is different from the type of the object to be identified among the plurality of clusters (Step S106).

The space of interest setting unit 21 removes the space of interest that is set to the specified cluster to be excluded (Step S107).

The determination unit 22 determines whether occlusion has occurred in the three-dimensional object corresponding to each cluster based on the positional relationship among the plurality of spaces of interest in the horizontal plane, the plurality of spaces of interest being set for each of the plurality of clusters by the space of interest setting unit 21 (Step S108).

The region of interest setting unit 24 sets a "region of interest" corresponding to the space of interest set by the space of interest setting unit 21 for the captured image acquired by the image acquisition unit 23 (Step S109).

The classifier 25 identifies the three-dimensional object corresponding to the region of interest by using the feature value of the region of interest set by the region of interest setting unit 24 (Step S110).

As described above, according to the third example embodiment, in the object identification apparatus 20, the determination unit 22 specifies, when a first space of interest and a second space of interest that constitute a pair are projected onto the vertical plane, a pair of the spaces of interest in which the first and the second spaces of interest overlap each other among all pairs of the spaces of interest in the plurality of spaces of interest set by the space of interest setting unit 21. Then, the determination unit 22 determines that occlusion has occurred in the three-dimensional object corresponding to the cluster that corresponds to either the first space of interest or the second space of interest of the specified pair of spaces of interest, whichever is farther from the irradiation point.

By the configuration of the object identification apparatus 20, it is possible to determine as to whether occlusion has occurred in the three-dimensional object corresponding to the cluster that corresponds to the space of interest based on the positional relationship among the spaces of interest, and thus it is possible to determine as to whether occlusion has occurred simply and accurately. As a result, in the object identification apparatus 20, it is possible to improve the accuracy of an object identification for identifying an object in the captured image based on a feature value.

Other Example Embodiments

Figure 8:
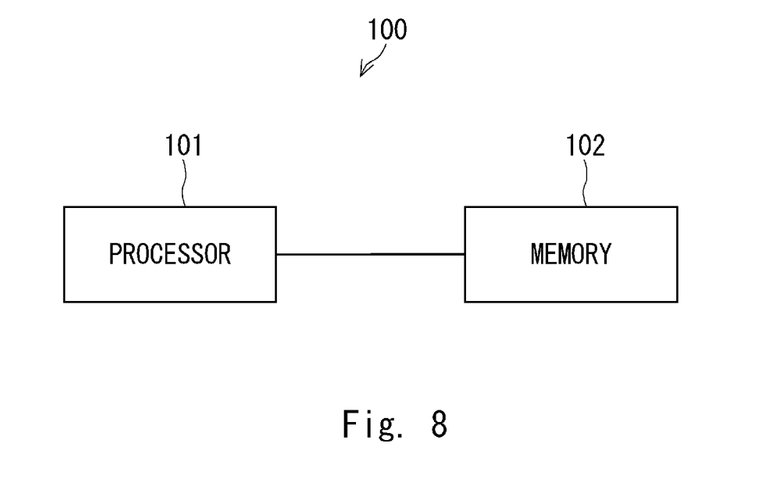
FIG. 8 shows an example of a hardware configuration of the object identification apparatus.

FIG. 8 shows an example of a hardware configuration of the object identification apparatus. In FIG. 8, an object identification apparatus 100 includes a processor 101 and a memory 102. The reflection point group information acquisition unit 11, the data conversion processing unit 12, the clustering processing unit 13, the space of interest setting units 14 and 21, the occlusion determination units 15 and 22, the image acquisition unit 23, the region of interest setting unit 24, and the classifier 25 of the object identification apparatuses 10 and 20 according to the first to the third example embodiments may be implemented by the processor 101 loading and executing a program stored in the memory 102. The program(s) may be stored in various types of non-transitory computer readable media and thereby supplied to the object identification apparatuses 10 and 20. Further, the program(s) may be supplied to the object identification apparatuses 10 and 20 by using various types of transitory computer readable media.

While the present invention has been described above with reference to example embodiments, the present invention is not limited to the above-described example embodiments. Various changes that can be understood by those skilled in the art can be made to the configurations and the details of the present invention within the scope of the present invention.

The whole or part of the example embodiments disclosed above can be described as, but not limited to, the following supplementary notes.

(Supplementary Note 1)

An object identification apparatus, comprising:

a reflection point group information acquisition unit configured to acquire a plurality of reflection point data units as a first data unit group, the plurality of reflection point data units being obtained by irradiating an irradiation light from an irradiation point toward irradiation directions that are successively changed in an irradiation direction range and receiving a reflected light that is light irradiated toward each irradiation direction and reflected at a reflection point of an object, the plurality of reflection point data units respectively corresponding to the reflection points that respectively correspond to the irradiation directions, the plurality of reflection point data units including reflection point position coordinates that include the irradiation directions and distances between each reflection point and the irradiation point;

a data conversion processing unit configured to convert a second data unit group including a plurality of reflection point data units in which the reflection point corresponding to each reflection point data unit belongs to a three-dimensional object among the first data unit group into a third data unit group including a plurality of projection point data units by projecting the second data unit group onto a horizontal plane in a world coordinate system;

a clustering processing unit configured to cluster the plurality of projection point data units into a plurality of clusters based on positions of these units on the horizontal plane; and a space of interest setting unit configured to set a space of interest in the world coordinate system for each cluster by using the plurality of reflection point data units corresponding to the plurality of projection point data units included in each of the clustered clusters.

(Supplementary Note 2)

The object identification apparatus described in Supplementary Note 1, wherein the clustering processing unit repeats a division and forms the plurality of clusters until a condition that the number of projection point data units included in each cluster is a predetermined number or less and that a Bayes information criterion after the division is smaller than a modified criterion obtained by multiplying the Bayes information criterion before the division by a predetermined coefficient greater than zero and less than one is satisfied, and the space of interest setting unit sets a plurality of spaces of interest for the plurality of formed clusters, and further sets a space of interest obtained by integrating two spaces of interest that overlap each other in the horizontal plane among the plurality of spaces of interest respectively set in the plurality of formed clusters.

(Supplementary Note 3)

The object identification apparatus described in Supplementary Note 1 or 2, further comprising an occlusion determination unit configured to determine that occlusion has occurred when a first space of interest and a second space of interest that constitute a pair are projected onto a vertical plane in the world coordinate system to thereby specify a pair of the spaces of interest in which the first and the second spaces of interest overlap each other among all pairs of the spaces of interest in the plurality of set spaces of interest.

(Supplementary Note 4)

The object identification apparatus described in Supplementary Note 3, wherein the occlusion determination unit determines that occlusion has occurred in a three-dimensional object corresponding to the cluster that corresponds to either the first space of interest or the second space of interest of the specified pair of spaces of interest, whichever is farther from the irradiation point.

(Supplementary Note 5)

The object identification apparatus described in any one of Supplementary Notes 1 to 4, wherein each of the reflection point data units further includes a received light intensity of a reflected light corresponding to each reflection point, and the space of interest setting unit specifies a cluster to be excluded corresponding to an object whose type is different from a type of an object to be identified among the plurality of clustered clusters based on the received light intensity of the reflection point data unit included in each target space of interest among the plurality of set spaces of interest, and removes a space of interest that is set to the specified cluster to be excluded.

(Supplementary Note 6)

The object identification apparatus described in any one of Supplementary Notes 1 to 5, wherein the space of interest setting unit specifies a cluster to be excluded corresponding to a space of interest whose width, height, and depth do not satisfy a shape criterion of the object to be identified among the plurality of set spaces of interest, and removes a space of interest that is set to the specified cluster to be excluded.

(Supplementary Note 7)

The object identification apparatus described in any one of Supplementary Notes 1 to 6, wherein the space of interest setting unit specifies a cluster to be excluded corresponding to a space of interest whose size of a region of interest obtained by projecting the space of interest onto the vertical plane in the world coordinate system does not satisfy a size criterion of the object to be identified among the plurality of set spaces of interest, and removes a space of interest that is set to the specified cluster to be excluded.

(Supplementary Note 8)

The object identification apparatus described in Supplementary Note 3 or 4, further comprising:

a region of interest setting unit configured to set a region of interest corresponding to the space of interest set by the space of interest setting unit for a captured image captured by an imaging unit; and a classifier configured to identify, when the occlusion determination unit determines that occlusion has occurred, a three-dimensional object corresponding to the set region of interest by using a feature value of a region obtained by excluding an occlusion region from the region of interest set corresponding to a pair of spaces of interest in which it is determined that the occlusion has occurred.

(Supplementary Note 9)

An object identification method comprising:

acquiring a plurality of reflection point data units as a first data unit group, the plurality of reflection point data units being obtained by irradiating an irradiation light from an irradiation point toward irradiation directions that are successively changed in an irradiation direction range and receiving a reflected light that is light irradiated toward each irradiation direction and reflected at a reflection point of an object, the plurality of reflection point data units respectively corresponding to the reflection points that respectively correspond to the irradiation directions, the plurality of reflection point data units including reflection point position coordinates that include the irradiation directions and distances between each reflection point and the irradiation point;

converting a second data unit group including a plurality of reflection point data units in which the reflection point corresponding to each reflection point data unit belongs to a three-dimensional object among the first data unit group into a third data unit group including a plurality of projection point data units by projecting the second data unit group onto a horizontal plane in a world coordinate system;

clustering the plurality of projection point data units into a plurality of clusters based on positions of these units on the horizontal plane; and setting a space of interest in the world coordinate system for each cluster by using the plurality of reflection point data units corresponding to the plurality of projection point data units included in each of the clustered clusters.

(Supplementary Note 10)

The object identification method described in Supplementary Note 9, wherein in the clustering, a division is repeated to thereby form the plurality of clusters until a condition that the number of projection point data units included in each cluster is a predetermined number or less and that a Bayes information criterion after the division is smaller than a modified criterion obtained by multiplying the Bayes information criterion before the division by a predetermined coefficient greater than zero and less than one is satisfied, and in the setting of the space of interest, a plurality of spaces of interest are set for the plurality of formed clusters, and a space of interest obtained by integrating two spaces of interest that overlap each other in the horizontal plane among the plurality of spaces of interest respectively set in the plurality of formed clusters is further set.

(Supplementary Note 11)

The object identification method described in Supplementary Note 9 or 10, further comprising determining that occlusion has occurred when a first space of interest and a second space of interest that constitute a pair are projected onto a vertical plane in the world coordinate system to thereby specify a pair of the spaces of interest in which the first and the second spaces of interest overlap each other among all pairs of the spaces of interest in the plurality of set spaces of interest.

(Supplementary Note 12)

The object identification method described in Supplementary Note 11, wherein in the determination of occlusion, it is determined that occlusion has occurred in a three-dimensional object corresponding to the cluster that corresponds to either the first space of interest or the second space of interest of the specified pair of spaces of interest, whichever is farther from the irradiation point.

(Supplementary Note 13)

The object identification method described in any one of Supplementary Notes 9 to 12, wherein each of the reflection point data units further includes a received light intensity of a reflected light corresponding to each reflection point, and in the setting of the space of interest, a cluster to be excluded corresponding to an object whose type is different from a type of an object to be identified is specified among the plurality of clustered clusters based on the received light intensity of the reflection point data unit included in each target space of interest among the plurality of set spaces of interest, and a space of interest that is set to the specified cluster to be excluded is removed.

(Supplementary Note 14)

The object identification method described in any one of Supplementary Notes 9 to 13, wherein in the setting of the space of interest, a cluster to be excluded corresponding to a space of interest whose width, height, and depth do not satisfy a shape criterion of the object to be identified is specified among the plurality of set spaces of interest, and a space of interest that is set to the specified cluster to be excluded is removed.

(Supplementary Note 15)

The object identification method described in any one of Supplementary Notes 9 to 14, wherein in the setting of the space of interest, a cluster to be excluded corresponding to a space of interest whose size of a region of interest obtained by projecting the space of interest onto the vertical plane in the world coordinate system does not satisfy a size criterion of the object to be identified is specified among the plurality of set spaces of interest, and a space of interest that is set to the specified cluster to be excluded is removed.

(Supplementary Note 16)

The object identification method described in Supplementary Note 11 or 12, further comprising:

setting a region of interest corresponding to the set space of interest for a captured image captured by the imaging unit; and identifying, when it is determined that the occlusion has occurred, a three-dimensional object corresponding to the set region of interest by using a feature value of a region obtained by excluding an occlusion region from the region of interest set corresponding to a pair of spaces of interest in which it is determined that the occlusion has occurred.

(Supplementary Note 17)

A control program for causing an object identification apparatus to execute the following processing of:

acquiring a plurality of reflection point data units as a first data unit group, the plurality of reflection point data units being obtained by irradiating an irradiation light from an irradiation point toward irradiation directions that are successively changed in an irradiation direction range and receiving a reflected light that is light irradiated toward each irradiation direction and reflected at a reflection point of an object, the plurality of reflection point data units respectively corresponding to the reflection points that respectively correspond to the irradiation directions, the plurality of reflection point data units including reflection point position coordinates that include the irradiation directions and distances between each reflection point and the irradiation point;

converting a second data unit group including a plurality of reflection point data units in which the reflection point corresponding to each reflection point data unit belongs to a three-dimensional object among the first data unit group into a third data unit group including a plurality of projection point data units by projecting the second data unit group onto a horizontal plane in a world coordinate system;

clustering the plurality of projection point data units into a plurality of clusters based on positions of these units on the horizontal plane; and setting a space of interest in the world coordinate system for each cluster by using the plurality of reflection point data units corresponding to the plurality of projection point data units included in each of the clustered clusters.

This application is based upon and claims the benefit of priority from Japanese patent application No. 2018-069753, filed on Mar. 30, 2018, the disclosure of which is incorporated herein in its entirety by reference.

REFERENCE SIGNS LIST 10, 20 OBJECT IDENTIFICATION APPARATUS
11 REFLECTION POINT GROUP INFORMATION ACQUISITION UNIT
12 DATA CONVERSION PROCESSING UNIT
13 CLUSTERING PROCESSING UNIT
14, 21 SPACE OF INTEREST SETTING UNIT
15, 22 OCCLUSION DETERMINATION UNIT
23 IMAGE ACQUISITION UNIT
24 REGION OF INTEREST SETTING UNIT
25 CLASSIFIER

The invention claimed is:

1. An object identification apparatus, comprising:
hardware, including a processor and a memory;
reflection point group information acquisition unit that is implemented at least by the hardware and configured to acquire a plurality of reflection point data units as a first data unit group, the plurality of reflection point data units being obtained by irradiating an irradiation light from an irradiation point toward irradiation directions that are successively changed in an irradiation direction range and receiving a reflected light that is light irradiated toward each irradiation direction and reflected at a reflection point of an object, the plurality of reflection point data units respectively corresponding to the reflection points that respectively correspond to the irradiation directions, the plurality of reflection point data units including reflection point position coordinates that include the irradiation directions and distances between each reflection point and the irradiation point;

data conversion processing unit that is implemented at least by the hardware and configured to convert a second data unit group including a plurality of reflection point data units in which the reflection point corresponding to each reflection point data unit belongs to a three-dimensional object among the first data unit group into a third data unit group including a plurality of projection point data units by projecting the second data unit group onto a horizontal plane in a world coordinate system;

clustering processing unit that is implemented at least by the hardware and configured to cluster the plurality of projection point data units into a plurality of clusters based on positions of these units on the horizontal plane; and space of interest setting unit that is implemented at least by the hardware and configured to set a space of interest in the world coordinate system for each cluster by using the plurality of reflection point data units corresponding to the plurality of projection point data units included in each of the clustered clusters, wherein the clustering processing unit repeats a division and forms the plurality of clusters until a condition that the number of projection point data units included in each cluster is a predetermined number or less and that a Bayes information criterion after the division is smaller than a modified criterion obtained by multiplying the Bayes information criterion before the division by a predetermined coefficient greater than zero and less than one is satisfied, and the space of interest setting unit sets a plurality of spaces of interest for the plurality of formed clusters, and further sets a space of interest obtained by integrating two spaces of interest that overlap each other in the horizontal plane among the plurality of spaces of interest respectively set in the plurality of formed clusters.

2. The object identification apparatus according to claim 1, further comprising occlusion determination unit that is implemented at least by the hardware and configured to determine that occlusion has occurred when a first space of interest and a second space of interest that constitute a pair are projected onto a vertical plane in the world coordinate system to thereby specify a pair of the spaces of interest in which the first and the second spaces of interest overlap each other among all pairs of the spaces of interest in the plurality of set spaces of interest.

3. The object identification apparatus according to claim 2, wherein the occlusion determination unit determines that occlusion has occurred in a three-dimensional object corresponding to the cluster that corresponds to either the first space of interest or the second space of interest of the specified pair of spaces of interest, whichever is farther from the irradiation point.

4. The object identification apparatus according to claim 2, further comprising:

region of interest setting unit that is implemented at least by the hardware and configured to set a region of interest corresponding to the space of interest set by the space of interest setting unit for a captured image captured by an imaging unit; and a classifier that is implemented at least by the hardware and configured to identify, when the occlusion determination unit determines that occlusion has occurred, a three-dimensional object corresponding to the set region of interest by using a feature value of a region obtained by excluding an occlusion region from the region of interest set corresponding to a pair of spaces of interest in which it is determined that the occlusion has occurred.

5. The object identification apparatus according to claim 1, wherein each of the reflection point data units further includes a received light intensity of a reflected light corresponding to each reflection point, and the space of interest setting unit specifies a cluster to be excluded corresponding to an object whose type is different from a type of an object to be identified among the plurality of clustered clusters based on the received light intensity of the reflection point data unit included in each target space of interest among the plurality of set spaces of interest, and removes a space of interest that is set to the specified cluster to be excluded.

6. The object identification apparatus according to claim 1, wherein the space of interest setting unit specifies a cluster to be excluded corresponding to a space of interest whose width, height, and depth do not satisfy a shape criterion of the object to be identified among the plurality of set spaces of interest, and removes a space of interest that is set to the specified cluster to be excluded.

7. The object identification apparatus according to claim 1, wherein the space of interest setting unit specifies a cluster to be excluded corresponding to a space of interest whose size of a region of interest obtained by projecting the space of interest onto the vertical plane in the world coordinate system does not satisfy a size criterion of the object to be identified among the plurality of set spaces of interest, and removes a space of interest that is set to the specified cluster to be excluded.

8. An object identification method comprising:

acquiring a plurality of reflection point data units as a first data unit group, the plurality of reflection point data units being obtained by irradiating an irradiation light from an irradiation point toward irradiation directions that are successively changed in an irradiation direction range and receiving a reflected light that is light irradiated toward each irradiation direction and reflected at a reflection point of an object, the plurality of reflection point data units respectively corresponding to the reflection points that respectively correspond to the irradiation directions, the plurality of reflection point data units including reflection point position coordinates that include the irradiation directions and distances between each reflection point and the irradiation point;

converting a second data unit group including a plurality of reflection point data units in which the reflection point corresponding to each reflection point data unit belongs to a three-dimensional object among the first data unit group into a third data unit group including a plurality of projection point data units by projecting the second data unit group onto a horizontal plane in a world coordinate system;

clustering the plurality of projection point data units into a plurality of clusters based on positions of these units on the horizontal plane; and setting a space of interest in the world coordinate system for each cluster by using the plurality of reflection point data units corresponding to the plurality of projection point data units included in each of the clustered clusters, wherein in the clustering, a division is repeated to thereby form the plurality of clusters until a condition that the number of projection point data units included in each cluster is a predetermined number or less and that a Bayes information criterion after the division is smaller than a modified criterion obtained by multiplying the Bayes information criterion before the division by a predetermined coefficient greater than zero and less than one is satisfied, and in the setting of the space of interest, a plurality of spaces of interest are set for the plurality of formed clusters, and a space of interest obtained by integrating two spaces of interest that overlap each other in the horizontal plane among the plurality of spaces of interest respectively set in the plurality of formed clusters is further set.

9. The object identification method according to claim 8, further comprising determining that occlusion has occurred when a first space of interest and a second space of interest that constitute a pair are projected onto a vertical plane in the world coordinate system to thereby specify a pair of the spaces of interest in which the first and the second spaces of interest overlap each other among all pairs of the spaces of interest in the plurality of set spaces of interest.

10. The object identification method according to claim 9, wherein in the determination of occlusion, it is determined that occlusion has occurred in a three-dimensional object corresponding to the cluster that corresponds to either the first space of interest or the second space of interest of the specified pair of spaces of interest, whichever is farther from the irradiation point.

11. The object identification method according to claim 9, further comprising:

setting a region of interest corresponding to the set space of interest for a captured image captured by an imaging unit; and identifying, when it is determined that the occlusion has occurred, a three-dimensional object corresponding to the set region of interest by using a feature value of a region obtained by excluding an occlusion region from the region of interest set corresponding to a pair of spaces of interest in which it is determined that the occlusion has occurred.

12. The object identification method according to claim 8, wherein each of the reflection point data units further includes a received light intensity of a reflected light corresponding to each reflection point, and in the setting of the space of interest, a cluster to be excluded corresponding to an object whose type is different from a type of an object to be identified is specified among the plurality of clustered clusters based on the received light intensity of the reflection point data unit included in each target space of interest among the plurality of set spaces of interest, and a space of interest that is set to the specified cluster to be excluded is removed.

13. The object identification method according to claim 8, wherein in the setting of the space of interest, a cluster to be excluded corresponding to a space of interest whose width, height, and depth do not satisfy a shape criterion of the object to be identified is specified among the plurality of set spaces of interest, and a space of interest that is set to the specified cluster to be excluded is removed.

14. The object identification method according to claim 8, wherein in the setting of the space of interest, a cluster to be excluded corresponding to a space of interest whose size of a region of interest obtained by projecting the space of interest onto the vertical plane in the world coordinate system does not satisfy a size criterion of the object to be identified is specified among the plurality of set spaces of interest, and a space of interest that is set to the specified cluster to be excluded is removed.

15. A non-transitory computer readable medium storing a control program for causing an object identification apparatus to execute the following processing of:

acquiring a plurality of reflection point data units as a first data unit group, the plurality of reflection point data units being obtained by irradiating an irradiation light from an irradiation point toward irradiation directions that are successively changed in an irradiation direction range and receiving a reflected light that is light irradiated toward each irradiation direction and reflected at a reflection point of an object, the plurality of reflection point data units respectively corresponding to the reflection points that respectively correspond to the irradiation directions, the plurality of reflection point data units including reflection point position coordinates that include the irradiation directions and distances between each reflection point and the irradiation point;

converting a second data unit group including a plurality of reflection point data units in which the reflection point corresponding to each reflection point data unit belongs to a three-dimensional object among the first data unit group into a third data unit group including a plurality of projection point data units by projecting the second data unit group onto a horizontal plane in a world coordinate system;

clustering the plurality of projection point data units into a plurality of clusters based on positions of these units on the horizontal plane; and setting a space of interest in the world coordinate system for each cluster by using the plurality of reflection point data units corresponding to the plurality of projection point data units included in each of the clustered clusters, wherein in the clustering, a division is repeated to thereby form the plurality of clusters until a condition that the number of projection point data units included in each cluster is a predetermined number or less and that a Bayes information criterion after the division is smaller than a modified criterion obtained by multiplying the Bayes information criterion before the division by a predetermined coefficient greater than zero and less than one is satisfied, and in the setting of the space of interest, a plurality of spaces of interest are set for the plurality of formed clusters, and a space of interest obtained by integrating two spaces of interest that overlap each other in the horizontal plane among the plurality of spaces of interest respectively set in the plurality of formed clusters is further set.

* * * * *